(12) United States Patent
Jones et al.

(10) Patent No.: US 6,708,951 B2
(45) Date of Patent: Mar. 23, 2004

(54) ANNULAR SEALING DEVICE HAVING A POSITIVE STOP MEANS FOR USE IN A VALVE MEMBER

(75) Inventors: Charlie E. Jones, Greer, SC (US); Michael V. Kazakis, Greer, SC (US); Brian N. Cooke, Simpsonville, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 220 days.

(21) Appl. No.: 10/051,581

(22) Filed: Jan. 17, 2002

(65) Prior Publication Data

US 2003/0132412 A1 Jul. 17, 2003

(51) Int. Cl.$^7$ .............................. F16K 25/00; F16K 1/44
(52) U.S. Cl. ........................................ 251/357; 251/333
(58) Field of Search ................................ 251/284–288, 251/356–365, 333–334

(56) References Cited

U.S. PATENT DOCUMENTS

| 3,168,283 | A | * | 2/1965 | Gamble | 251/357 |
|---|---|---|---|---|---|
| 3,511,475 | A | * | 5/1970 | Pfau | 251/357 |
| 3,605,793 | A | * | 9/1971 | Kinsel | 251/357 |
| 4,809,739 | A | * | 3/1989 | Scaramucci | 251/364 |
| 4,968,003 | A | * | 11/1990 | Danko | 251/285 |
| 5,647,398 | A | * | 7/1997 | Giesler | 251/359 |
| 5,901,749 | A | * | 5/1999 | Watson | 251/357 |

* cited by examiner

Primary Examiner—Paul J. Hirsch
(74) Attorney, Agent, or Firm—James Ray & Associates

(57) ABSTRACT

An annular sealing device having a positive stop to prevent over pressurization on the sealing device. The annular sealing device includes a substantially rigid support member having at least one substantially flat outer surface portion. There is a generally round cavity formed in the substantially rigid support member adjacent the at least one substantially flat outer surface. This generally round cavity has a first predetermined diameter and a predetermined depth. A generally round elastomeric sealing member having a predetermined thickness and a second predetermined diameter is disposed in the generally round cavity. Elastomeric sealing member has a substantially flat face engageable with a predetermined surface to be sealed. A stop means is engageable with at least a portion of the substantially flat outer surface portion of the substantially rigid support member for preventing undue penetration of the surface to be sealed into the generally round elastomeric sealing member.

20 Claims, 2 Drawing Sheets

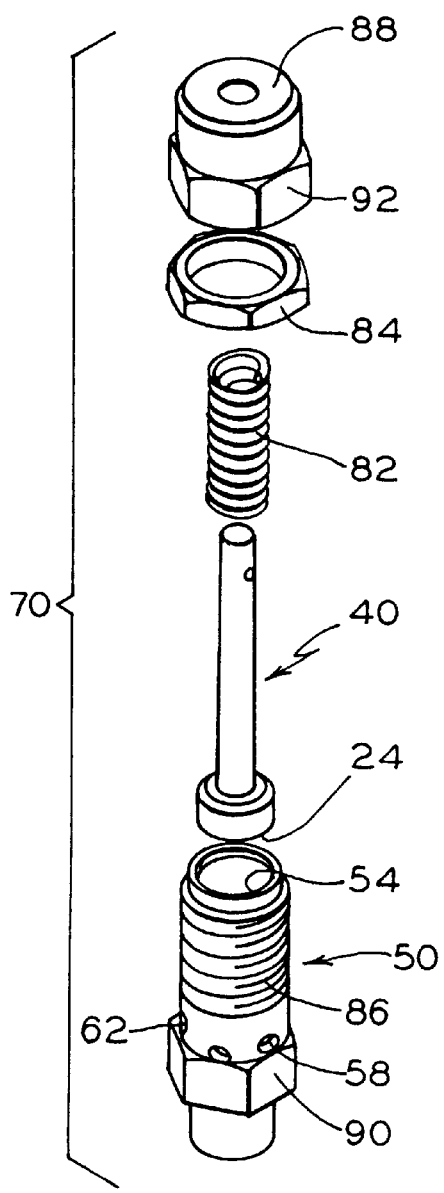
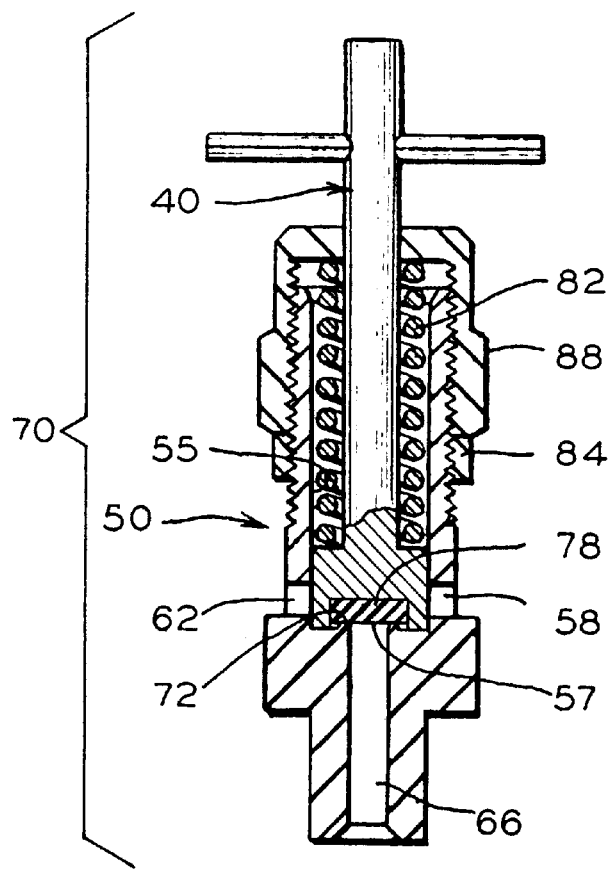
FIG. 1
FIG. 2

# ANNULAR SEALING DEVICE HAVING A POSITIVE STOP MEANS FOR USE IN A VALVE MEMBER

FIELD OF THE INVENTION

The present invention relates, in general, to sealing devices and, more particularly, this invention relates to a positive stop means for use in combination with an annular type sealing device and still, more particularly, the instant invention relates to an improved annular type sealing device having a positive stop means for use in at least one predetermined type valve member.

BACKGROUND OF THE INVENTION

As is generally well known in the fluid pressure art, various types of sealing devices have been in widespread use for a number of years. These sealing known sealing devices include annular type sealing devices which are used in valve members extensively to control the flow of fluids. Such sealing devices include both metal to metal type seals and flexible elastomeric type seals.

An example of a prior art valve equipped with a metal to metal type sealing means is taught in U.S. Pat. No. 5,145,150.

The flexible elastomeric type seals will generally take the form of an elastomer O-ring or a generally flat type sealing member. The generally flat type sealing members are usually of two distinct types. A first type being a substantially flat surface over the entire face of the sealing member. A second type includes an annular raised portion being disposed on the generally flat surface of the sealing member.

An example of a prior art annular type sealing device having a relatively flat surface is taught in U.S. Pat. No. 5,647,398.

During use, these sealing members can be subjected periodically to some rather severe operating pressures. These relatively severe operating pressures can and usually does cause detrimental premature wear on the sealing members. Obviously, such premature wear is an added cost for the user. Such added cost is due to both the cost of the sealing member itself and the labor cost that is associated with replacing the sealing member due to premature wear. Even more importantly is the down time that can be experienced on the equipment using such sealing members.

Of even more concern, however, is the fact that some valves may be employed in a critical use application and, in this application, if a seal should fail there could be catastrophic results. Some such critical use applications, for example, could be a brake valve used on a railway locomotive, or railway car, brake valve.

SUMMARY OF THE INVENTION

According to a first aspect, the present invention provides an annular sealing device having a positive stop. Such positive stop preventing over pressurization occurring on the sealing device. The annular sealing device includes a substantially rigid support member having at least one substantially flat outer surface portion. A generally round cavity is formed in a substantially rigid support member adjacent the at least one substantially flat outer surface. This generally round cavity has a first predetermined diameter and a predetermined depth. A generally round elastomeric sealing member having a predetermined thickness and at a second predetermined diameter is disposed in the generally round cavity formed in such substantially rigid support member. The elastomeric sealing member has a substantially flat face engage a bowl with a predetermined surface to be sealed. A stop means is incapable with at least a portion of such substantially flat outer surface portion of the substantially rigid support member for preventing undue penetration of the surface to be sealed into the generally round elastomeric sealing member.

According to a second aspect, the present invention provides an annular sealing device having a positive stop to prevent over pressurization on the annular sealing device. The annular sealing device comprises a substantially rigid support member having at least one substantially flat outer surface portion. A generally round cavity is formed in the substantially rigid support adjacent the at least one substantially flat outer surface. Such generally round cavity has a first predetermined diameter and a predetermined depth. There is a generally round elastomeric sealing member having a predetermined thickness and a second predetermined diameter disposed in the generally round cavity formed in such substantially rigid support member. The generally round elastomeric sealing member has a substantially flat face portion. An annular raised portion is disposed on the substantially flat face portion of the generally round elastomeric sealing member. This annular raised portion is engageable with a surface to be sealed. There is a stop means engageable with at least a portion of the substantially flat outer surface portion of the substantially rigid support member which prevents undue pressure on the annular raised portion of the general round elastomeric sealing member during use.

According to a third and final aspect, the present invention provides a valve device having improved sealing characteristics. Such valve device includes a valve body portion having a longitudinal bore formed therein and wrench engaging portion disposed on an outer surface thereof. A valve stem is disposed for longitudinal movement within such longitudinal bore formed in the valve body portion. Such valve stem having a substantially rigid flat bottom surface portion. There is a generally round cavity formed in the valve stem adjacent the substantially rigid flat bottom surface portion. This generally round cavity has a first predetermined diameter and a predetermined depth. A generally round elastomeric sealing member having a predetermined thickness and a second predetermined diameter is disposed in the generally round cavity formed in such valve stem adjacent the substantially rigid flat bottom surface portion. This generally round elastomeric sealing member has at least one of a substantially flat face engageable with a surface to be sealed and an annular raised portion disposed on the substantially flat face and engageable with a surface to be sealed. A stop means is engageable with at least a portion of the substantially flat rigid bottom surface portion of the valve stem for preventing undue pressure on the generally round elastomeric sealing member. A coil spring is disposed around a predetermined portion of the valve stem and a locking nut is threadedly engageable with an outer surface of such body adjacent one end thereof. Finally there is an adjusting nut threadedly engageable with the outer surface of the valve body adjacent such one end thereof.

OBJECTS OF THE INVENTION

It is, therefore, one of the primary objects of the present invention to provide an improved sealing member having a positive stop means which will thereby exhibit an extended life when compared to existing sealing members.

A further primary object of the present invention is to provide a valve device which will substantially prevent increased pressurization of fluid within a pressure vessel beyond the set point of the valve device.

Another object of the present invention is to provide an improved sealing member having a positive stop means which will be relatively inexpensive to manufacture when compared to prior art type sealing members.

Still another object of the present invention is to provide an improved sealing member having a positive stop means which can be interchangeable with existing sealing members without costly modifications.

Yet another object of the present invention is to provide an improved sealing member having a positive stop means which can withstand increased pressures when compared to existing sealing members.

An additional object of the present invention is to provide an improved sealing member having a positive stop means for use in a railway brake system which will increase the reliability of such brake system.

A further object of the present invention is to provide an improved sealing member having a positive stop means which when used in a valve member allows a very repeatable set point for such valve.

Still yet another object of the present invention is to provide an improved sealing member having a positive stop means in which such sealing member can be molded in place in a cavity formed in a valve stem thereby essentially eliminating the need for critical machining of the valve stem.

It is an additional object of the present invention to provide an improved sealing member having a positive stop means which will be more reliable in service.

In addition to the various objects and advantages of the present invention which have been described above, various other objects and advantages of the instant invention will become more readily apparent to those persons who are skilled in the relevant art from the following more detailed description of the invention, particularly, when such detailed description is taken in conjunction with the attached drawing Figures and with the appended claims.

BRIEF DESCRIPTION OF THE DRAWING FIGURES

FIG. 1 is a cross sectional view of a valve member incorporating the annular sealing device of the present invention;

FIG. 2 is an exploded view of the valve member illustrated in FIG. 1 in which the annular sealing device of the present invention could be used;

BRIEF DESCRIPTION OF A PRESENTLY PREFERRED AND

VARIOUS ALTERNATIVE EMBODIMENTS OF THE PRESENT INVENTION

Figure 3:
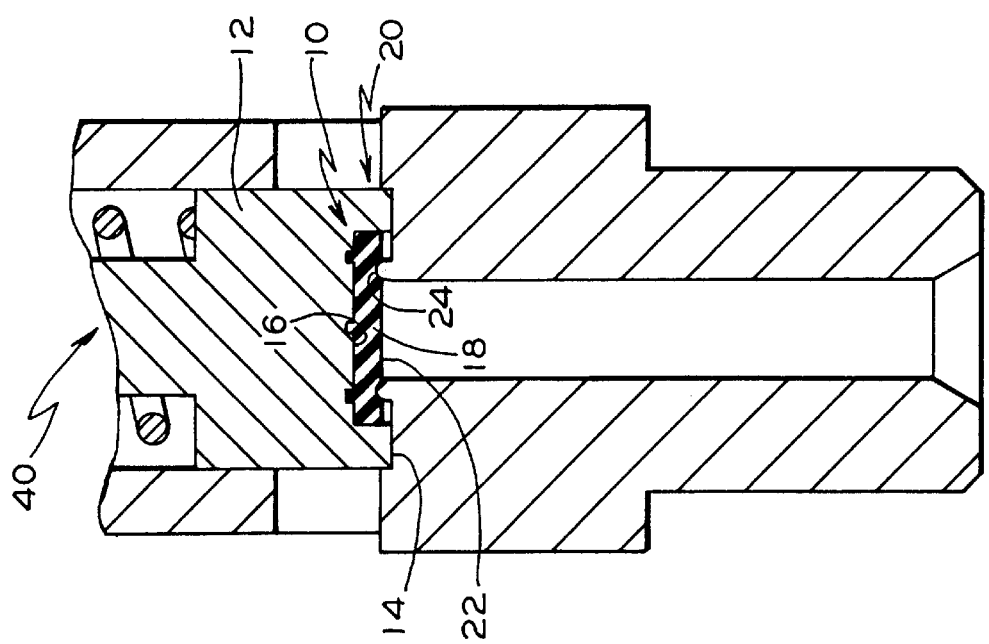
FIG. 3 is a cross sectional view of one presently preferred embodiment of the annular sealing device according to the present invention.
Figure 4:
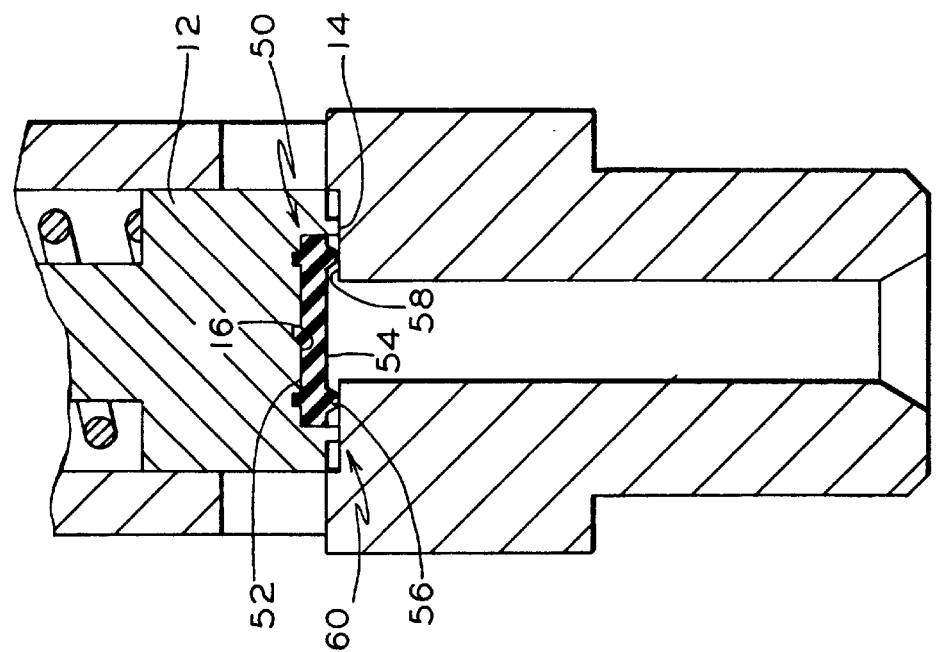
FIG. 4 is a cross-sectional of view of an alternative embodiment of the annular sealing device according to the present invention.

Prior to proceeding to the more detailed description of the present invention, it should be noted that for the sake of clarity and understanding, identical components, which have identical functions, have been identified with identical reference numerals throughout the several views illustrated in the attached drawing figures.

Now refer, more particularly, to FIG. 3. Illustrated therein is an annular sealing device, generally designated 10. Annular sealing device 10 includes a positive stop means, generally designated 20, to prevent over pressurization of the sealing device 10 during use.

Annular sealing device 10 includes a substantially rigid support member 12 having at least one substantially flat outer surface portion 14. A generally round cavity 16 is formed in the substantially rigid support member 12 adjacent the at least one substantially flat outer surface 14. Such generally round cavity 16 has a first predetermined diameter and a predetermined depth.

A generally round elastomeric sealing member 18 having a predetermined thickness and a second predetermined diameter is disposed in the generally round cavity 16 formed in the substantially rigid support member 12. Such elastomeric sealing member 18 has a substantially flat face 22 engageable with a predetermined surface 24 to be sealed.

The final essential member of the annular sealing device 10 is the stop means, generally designated 20, which is engageable with at least a portion of the substantially flat outer surface portion 14 of the substantially rigid support member 12. Such stop means 20 prevents any undue penetration of the surface 24 that is to be sealed into the generally round elastomeric sealing member 18.

According to the presently preferred embodiment, the substantially rigid support member 12 is a valve stem, generally designated 40 (FIGS. 1 and 2), disposed in a valve body, generally designated 50. In this presently preferred embodiment, the generally round elastomeric sealing member 18 is formed in place in the generally round cavity 16 in the valve stem 40. Likewise, in this embodiment, the first predetermined diameter and the second predetermined diameter will be substantially identical.

Additionally, the predetermined depth of the generally round cavity 16 formed in such substantially rigid support member 12 may be greater than or less than the predetermined thickness of the general round elastomeric sealing member 18. In either case, the stop means 20 is disposed closely adjacent the predetermined surface 24 to be sealed.

According to a second embodiment, the present invention provides an annular sealing device, generally designated 50, having a positive stop means, generally designated 60, which prevents over pressurization of the annular sealing device 50.

Annular sealing device 50, includes a substantially rigid support member 12 having at least one substantially flat outer surface portion 14. There is a generally round cavity 16 formed in the substantially rigid support member 12 adjacent the at least one substantially flat outer surface 14. This generally round cavity 16 has a first predetermined diameter and a predetermined depth. Such generally round cavity 16 having a first predetermined diameter and a predetermined depth.

There is a generally round elastomeric sealing member 52 having a predetermined thickness and a second predetermined diameter is disposed in the generally round cavity 16 formed in the substantially rigid support member 12. Such generally round elastomeric sealing member 52 has a substantially flat face portion 54. An annular raised portion 56 is disposed on the substantially flat face portion 54 of such generally round elastomeric sealing member 52. This annular raised portion 56 is engageable with a surface 58 to be sealed.

The final essential element, in this alternative embodiment, closely is the stop means 60 engageable with at least a portion of the substantially flat outer surface portion 54 of such substantially rigid support member 12. Such stop means 60 prevents any undue pressure being exerted on the annular raised portion 56 of such generally round elastomeric sealing member 52.

In the presently preferred embodiment of this alternative arrangement, the annular raised portion 56 is an elastomer. Additionally, such annular raised portion 56 and the generally round of elastomeric sealing member 52 will be molded as a unitary piece.

Further, the predetermined depth of the generally round cavity 16 will be greater than the predetermined thickness of such generally round elastomeric sealing member 52 and the annular raised portion 56 will extend outwardly from the substantially flat outer surface portion 54 of the substantially rigid support member 12. In this embodiment the substantially rigid support member 12 will be formed from at least one of metal and plastic. Preferably, such substantially rigid support member 12 will be formed from a metal selected from steel and aluminum.

According to a final aspect of the present invention, reference is now made to FIGS. 1 and 2. Illustrated therein is a valve device, generally designated 70, having improved sealing characteristics. Such valve device 70 includes a valve body portion 50 having a longitudinal bore 55 and air passages 66, 58 and 62 formed therein.

Valve stem 40 is disposed for longitudinal movement within the longitudinal bore 54 formed in the valve body portion 50. Such valve stem 40 has a substantially rigid flat bottom surface portion 14. A generally round cavity 16 is formed in such valve stem 40 adjacent the substantially rigid flat bottom surface portion 14. This generally round cavity 16 also has a first predetermined diameter and a predetermined depth.

A generally round elastomeric sealing member 78, having a predetermined thickness and a second predetermined diameter, is disposed in the generally round cavity 16 formed in the valve stem 40 adjacent the substantially rigid bottom surface portion 14. Such generally round elastomeric sealing member 78 includes at least one of a substantially flat face 57 engageable with a surface 72 to be sealed and an annular raised portion 56 disposed on such substantially flat face 57 and engageable with the surface 72 to be sealed.

A stop means, generally designated 80, is engageable with at least a portion of the substantially rigid bottom surface portion 14 of the valve stem 44 for preventing undue pressure on the generally round elastomeric sealing member 18.

A coil spring 82 is disposed around a predetermined portion of the valve stem 40. A locking nut 84 is threadedly engageable with an outer surface 86 of the bout body 50 adjacent one end thereof. An adjusting nut 88 is threadedly engageable with the outer surface 86 of about body 50 adjacent such one end thereof.

In the present preferred embodiment, the valve body portion 50 includes a wrench engaging portion 90 formed on an outer surface thereof. Additionally, the adjusting nut 88 includes a wrench engaging portion 92 formed on an outer surface thereof. The locking nut 84 is engageable with the adjusting nut 88.

Preferably, elastomeric sealing member 78 is formed from at least one of rubber, synthetic rubber, plastics and various combinations thereof. It is most preferred, that such elastomeric sealing member 78 be formed from rubber.

We claim:

1. An annular sealing device having a positive stop to prevent over pressurization on the sealing device, said annular sealing device comprising:

(a) a substantially rigid support member having at least one substantially flat outer surface portion;

(b) a generally round cavity formed in said substantially rigid support member adjacent said at least one substantially flat outer surface, said generally round cavity having a first predetermined diameter and a predetermined depth;

(c) a generally round elastomeric sealing member having a predetermined thickness and a second predetermined diameter disposed in said generally round cavity formed in said substantially rigid support member, said elastomeric sealing member having a substantially flat face engageable with a predetermined surface to be sealed; and (d) a stop means engageable with at least a portion of said substantially flat outer surface portion of said substantially rigid support member for preventing undue penetration of said surface to be sealed into said generally round elastomeric sealing member.

2. An annular sealing device, according to claim 1, wherein said substantially rigid support member is a valve stem disposed in a valve body.

3. An annular sealing device, according to claim 1 wherein said generally round elastomeric sealing member is formed in place in said generally round cavity.

4. An annular sealing device, according to claim 3, wherein said first predetermined diameter and said second predetermined diameter are identical.

5. An annular sealing device, according to claim 4, wherein said predetermined depth of said generally round cavity formed in said substantially rigid support member is greater than said predetermined thickness of said generally round elastomeric sealing member.

6. An annular sealing device, according to claim 4, wherein said predetermined depth of said generally round cavity formed in said substantially rigid support member is less than said predetermined thickness of said generally round the last American sealing member.

7. An annular sealing device, according to claim 1, wherein said stop means is disposed closely adjacent said predetermined surface to be sealed.

8. An annular sealing device having a positive stop to prevent over pressurization of said annular sealing device, said annular sealing device comprising:

(a) a substantially rigid support member having at least one substantially flat outer surface portion;

(b) a generally round cavity formed in said substantially rigid support adjacent said at least one substantially flat outer surface, said generally round cavity having a first predetermined diameter and a predetermined depth;

(c) a generally round elastomeric sealing member having a predetermined thickness and a second predetermined diameter disposed in said generally round cavity formed in said substantially rigid support member, said generally round elastomeric sealing member having a substantially flat face portion;

(d) an annular raised portion disposed on said substantially flat face portion of said generally round elastomeric sealing member, said annular raised portion engageable with a surface to be sealed; and (e) a stop means engageable with at least a portion of said substantially flat outer surface portion of said substantially rigid support member for preventing undue pressure on said annular raised portion of said generally round elastomeric sealing member.

9. An annular sealing device, according to claim 8, wherein said annular raised portion is an elastomer.

10. An annular sealing device, according to claim 9, wherein said annular raised portion and said generally round elastomeric sealing member are molded as a unitary piece.

11. An annular sealing device, according to claim 8, wherein said predetermined depth of said generally round cavity is greater than said predetermined thickness of said generally round elastomeric sealing member.

12. An annular sealing device, according to claim 11, wherein said annular raised portion extends outwardly from said substantially flat outer surface portion of said substantially rigid support member.

13. An annular sealing device, according to claim 8, wherein said substantially rigid support member is at least one of metal and plastic.

14. An annular sealing device, according to claim 13, wherein said substantially rigid support member is metal selected from steel and aluminum.

15. A valve device having improved sealing characteristics, said valve device comprising:

(a) a valve body portion having a longitudinal bore formed therein;

(b) a valve stem disposed for longitudinal movement within said longitudinal bore formed in said valve body portion, said valve stem having a substantially rigid flat bottom surface portion;

(c) a generally round cavity formed in said valve stem adjacent said substantially rigid flat bottom surface portion, said generally round cavity having a first predetermined diameter and a predetermined depth;

(d) a generally round elastomeric sealing member having a predetermined thickness and a second predetermined diameter disposed in said generally round cavity formed in said valve stem adjacent said substantially rigid flat bottom surface portion, said generally round elastomeric sealing member having at least one of a substantially flat face engageable with a surface to be sealed and an annular raised portion disposed on said substantially flat face and engageable with a surface to be sealed;

(e) a stop means engageable with at least a portion of said substantially rigid flat bottom surface portion of said valve stem for preventing undue pressure on said generally round elastomeric sealing member;

(f) a coil spring disposed around a predetermined portion of said valve stem;

(g) a locking nut threadedly engageable with an outer surface of said valve body adjacent one end thereof; and (h) an adjusting nut threadedly engageable with said outer surface of said valve body adjacent said one end thereof.

16. A valve device, according claim 15, wherein said valve body portion includes a wrench engaging portion formed on an outer surface thereof.

17. A valve device, according to claim 16, wherein said adjusting nut includes a wrench engaging portion formed on an outer surface thereof.

18. A valve device, according to claim 15, wherein said elastomeric sealing member is formed from at least one of rubber, synthetic rubber, plastics and various combinations thereof.

19. A valve device, according to claim a 18, wherein said elastomeric sealing member is formed from rubber.

20. A valve device, according to claim 15, wherein said locking nut is engageable with said adjusting nut.

* * * * *